US007110759B2

(12) United States Patent
Lewiner et al.

(10) Patent No.: US 7,110,759 B2
(45) Date of Patent: Sep. 19, 2006

(54) LOCAL RADIO COMMUNICATION SYSTEM

(75) Inventors: Jacques Lewiner, Saint-Cloud (FR); Eric Carreel, Meudon (FR)

(73) Assignee: Inventel Systems, Paris (FR)

(*) Notice: Subject to any disclaimer, the term of this patent is extended or adjusted under 35 U.S.C. 154(b) by 399 days.

(21) Appl. No.: 10/469,429

(22) PCT Filed: Feb. 22, 2002

(86) PCT No.: PCT/FR02/00664

§ 371 (c)(1),
(2), (4) Date: Jan. 30, 2004

(87) PCT Pub. No.: WO02/069579

PCT Pub. Date: Sep. 6, 2002

(65) Prior Publication Data

US 2004/0116114 A1 Jun. 17, 2004

(51) Int. Cl.
*H04Q 7/20* (2006.01)

(52) U.S. Cl. ................................ 455/426.2; 455/422.1

(58) Field of Classification Search ............ 455/422.1, 455/434, 426.2, 514, 432.3, 41.2, 404.1, 455/424, 456.1, 466, 456.5, 453, 404.2, 561, 455/426.1, 41, 469.1, 62, 575.1
See application file for complete search history.

(56) References Cited

U.S. PATENT DOCUMENTS 5,594,720 A 1/1997 Papadopoulos et al.
5,598,417 A 1/1997 Crisler et al.
5,844,894 A 12/1998 Dent
5,852,405 A 12/1998 Yoneda et al.
5,936,947 A 8/1999 Fujii
5,949,775 A 9/1999 Rautiola et al.
5,949,776 A 9/1999 Mahany et al.
6,038,455 A 3/2000 Gardner et al.
6,069,885 A 5/2000 Fong et al.
6,091,936 A 7/2000 Chennakeshu et al.
6,097,707 A 8/2000 Hodzic et al.
6,133,942 A 10/2000 Lee
6,366,840 B1 * 4/2002 Buckley ...................... 701/36
6,788,656 B1 * 9/2004 Smolentzov et al. ....... 370/328

FOREIGN PATENT DOCUMENTS

EP 0 435 283 A1 12/1990
EP 0 462 728 A2 12/1991
EP 0 470 831 A2 2/1992
EP 0 720 405 A2 7/1996
EP 0 841 826 A2 5/1998

(Continued)

OTHER PUBLICATIONS

French Search Report of FR-01 02724 mailed Dec. 06, 2001.

(Continued)

*Primary Examiner*—Edan Orgad
*Assistant Examiner*—Dominic E. Rego
(74) *Attorney, Agent, or Firm*—Marshall, Gerstein & Borun LLP

(57) ABSTRACT

The invention relates to a local radio communication system comprising a central controller (9), several bases (7) which are connected to the controller and several terminals (5) which communicate with the bases. The bases (7) communicate with the terminals using a local radio communication protocol with time division multiple access. Said bases are adapted to real-time transmit chronological information to the controller releasing to the transmissions planned for said bases. The controller is adapted to determine if there is a risk of interferences occurring between the planned transmissions and to impose a chronology for said planned transmissions on the bases in order to limit said interferences.

22 Claims, 2 Drawing Sheets

FOREIGN PATENT DOCUMENTS

| | | | |
|---|---|---|---|
| EP | 0 843 494 | A2 | 5/1998 |
| EP | 1 028 484 | A2 | 8/2000 |
| GB | 2 317 786 | | 1/1998 |
| WO | WO-94/09568 | A1 | 4/1994 |
| WO | WO-96/17485 | A2 | 6/1996 |
| WO | WO-97/01256 | A1 | 1/1997 |
| WO | WO-97/07647 | A1 | 2/1997 |
| WO | WO-98/05131 | A1 | 2/1998 |
| WO | WO-98/42150 | A2 | 9/1998 |
| WO | WO-98/51109 | A1 | 11/1998 |
| WO | WO-00/14921 | A1 | 3/2000 |
| WO | WO-00/19636 | A1 | 4/2000 |
| WO | WO-00/27147 | A1 | 5/2000 |
| WO | WO-00/48367 | A2 | 8/2000 |
| WO | WO-00/69186 | A1 | 11/2000 |
| WO | WO-93/07684 | A1 | 4/2003 |

OTHER PUBLICATIONS

International Search Report of PCT/FR02/00665 mailed Jul. 26, 2002.

Search Report of FR-01 02725 mailed Dec. 18, 2001.

International Search Report of PCT/FR02/00664 mailed Jul. 26, 2002.

Haartsen, J.C., “The Bluetooth Radio System,” IEEE Personal Communications, Feb. 2000, pp. 28-36.

* cited by examiner 1
2
3
4
5
6
C3
CS
T1
T2
T3
T4
T5
T6
T7
T8
T9
T10
T11
T12
T13
T14
T15
T16
C1
C2

C1
C2
C3
T1
T2
T7
T3
T4
T8
T10
T9
T11
T12
T13
T14
T15
T16
T5
T6
5
1
CS
8
B1
B2
B3
7
4
MP
M
CONTR.
9
INT.
10
6

LOCAL RADIO COMMUNICATION SYSTEM

BACKGROUND OF THE INVENTION

The present invention relates to local radiocommunication systems.

More particularly, the invention relates to a local radiocommunication system comprising:

at least one central controller, several bases connected to the controller and controlled by said controller, and several terminals, each communicating with at least one of the bases, according to a master/slave process where the base plays a role of master and the terminal plays a role of slave at least after setting up a radio link between said base and said terminal, the bases communicating with the terminals according to the same time division multiple access local radiocommunication protocol (for example the BLUETOOTH protocol or the DECT protocol), said protocol providing, for each base, successive time slots during which either an uplink information packet sent by a terminal to said base or a downlink information packet sent by said base to said terminal are transmitted, and said base being adapted to determine in advance and impose planned transmissions between said base and said terminal, said planned transmissions comprising planned transmissions of downlink information and planned slots of uplink information, where the terminal is authorized to transmit an uplink information packet to the base, and at least some of said bases being susceptible to reciprocal interference, preventing the reception by one of said bases of an uplink information packet when another of said bases is transmitting a downlink information packet.

Document WO-A-00/69186 describes an example of a local radiocommunication system of this type.

In a local radiocommunication system of this type, there is, however, a risk of interference between the transmission of an uplink information packet from a terminal to a base and the transmission of a downlink information packet from a different base to a terminal (at the same frequency or at an adjacent frequency).

Such interferences must be avoided since they render the uplink information packets "inaudible" to the bases, due to the fact that the uplink information radio signals are generally received by a base with a power which is substantially weaker than the power of the downlink information signals transmitted by a different base: the uplink information packets thus lost must subsequently be retransmitted, thereby reducing the effective throughput of the radiocommunication system.

The object of the present invention is, in particular, to eliminate this disadvantage by reducing the probability of interference between uplink information packets and downlink information packets.

For this purpose, according to the invention, a radiocommunication system of the type concerned is characterized in that the different bases are adapted to transmit to the controller, in real time, at least chronological information relating to transmissions planned by said bases, and in that said controller is adapted to determine whether there is a risk of interferences occurring between said planned transmissions, and to impose on the bases a chronology of said planned transmissions which enables at least some of said interferences to be avoided.

Thanks to these measures, the controller makes it possible for the majority of interferences between uplink and downlink connections to be foreseen and avoided, taking account of the fact that the large majority of downlink communications are planned in advance by the bases, and that the large majority of uplink communications are authorized by the bases.

SUMMARY OF THE INVENTION

Optionally, one and/or the other of the following measures may be used in preferred embodiments of the invention:

the controller is adapted to synchronize the different bases among themselves, in such a way that all said bases transmit more or less during the same time slots and receive more or less during the same time slots (apart from the difference between the duration of the standard-length information packets and the duration of the time slots, this difference being generally referred to as the guard time: in other words, slight differences between the start of the time slots of the different bases may be tolerated or even imposed, provided that these differences is less than the aforementioned guard time);

the radiocommunication protocol provides transmissions of standard-length information packets extending at most over one time slot, and transmissions of long information packets extending over a number of more than 1 successive time slots, the controller being adapted to impose on the different bases that all the standard-length uplink information packets corresponding to all said bases are transmitted during the same time slots alternately with other time slots in which all the standard-length downlink information packets corresponding to all said bases are transmitted;

the radiocommunication protocol provides that the terminals send uplink information packets to the bases solely in response to a downlink information packet received from a base, and the controller is adapted:

when a base has to send a long information packet to a terminal, to prevent the other bases from sending to the other terminals a downlink information packet requesting a response for the duration of the transmission of said long information packet, and, when a terminal has to send a long information packet to a base, to prevent the other bases from sending a downlink information packet for the duration of the transmission of this long information packet;

the controller has in its memory information indicating pairs of bases susceptible to reciprocal interference, and is adapted to delay at least some of the planned transmissions only between said bases susceptible to reciprocal interference, so as to avoid at least some interferences;

the bases are adapted to each carry out measurements of the signals respectively received when the other bases are transmitting a radio signal, the controller being adapted to determine said pairs of bases susceptible to reciprocal interference on the basis of said measurements;

the bases are adapted to transmit to the controller, in addition to the chronological information, planned frequency information indicating the frequency at which the planned transmissions must take place, the controller has in its memory, for each pair of bases susceptible to reciprocal interference, information indicating pairs of interference frequencies at which said bases are susceptible to interference, and said controller is adapted to delay at least some of the planned transmissions only for said planned frequencies corresponding to a pair of interference frequencies between said bases susceptible to reciprocal interference, so as to avoid at least some interferences;

the bases are adapted to transmit to the controller, in addition to the chronological information, planned transmission category information indicating at least whether the information to be transmitted is or is not voice, and the controller is adapted not to delay a planned voice transmission;

the different bases are disposed in the immediate vicinity of one another;

the controller and the bases are contained in the same unit;

the controller also acts as a concentrator and makes the bases communicate with an external link;

the bases and the terminals are adapted to communicate according to-the BLUETOOTH protocol.

BRIEF DESCRIPTION OF THE DRAWINGS

Other characteristics and advantages of the invention will become apparent in the following description of one of its embodiments, provided by way of a non-limiting example, with reference to the attached drawings.

In the drawings.

DETAILED DESCRIPTION OF THE INVENTION

In the different figures, the same references refer to identical or similar components.

Figure 1:
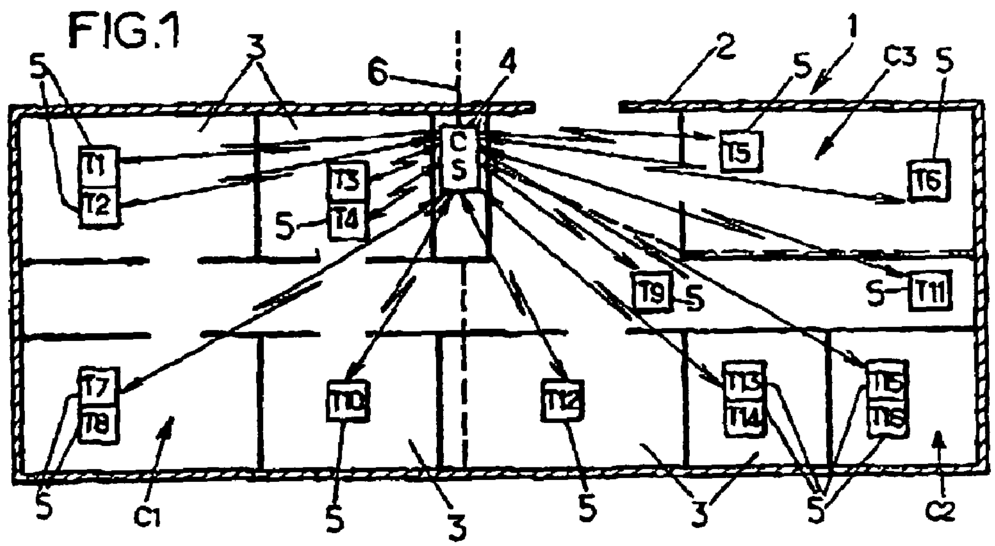
FIG. 1 shows a schematic view of a building equipped with a radiocommunication system according to one embodiment of the invention.

FIG. 1 shows a local radiocommunication system according to one embodiment of the invention, serving a location 2, such as a group of offices 3, or a residential location, or the like.

This local radiocommunication network comprises a central station 4 (CS) which communicates via a radio link with several fixed or mobile terminals 5 according to a local radiocommunication protocol such as the BLUETOOTH protocol or the DECT protocol, or other protocol of the TDMA (time division multiple access) type. The invention will be described below in the specific case of the BLUETOOTH protocol, by way of example, but said invention could be applied in a similar fashion to the DECT protocol, or other protocol.

The terminals 5 may, for example, be cordless telephones, microcomputers, electronic books, digital television sets, etc.

These terminals 5 may:

if necessary, dialog with one another via the central station 4, or communicate with the outside, still via said central station 4 which has a telecommunications link 6 to a public telecommunications network. It will be noted that the link 6 may be either a wired link or a wireless link, for example a radio link.

Figure 2:
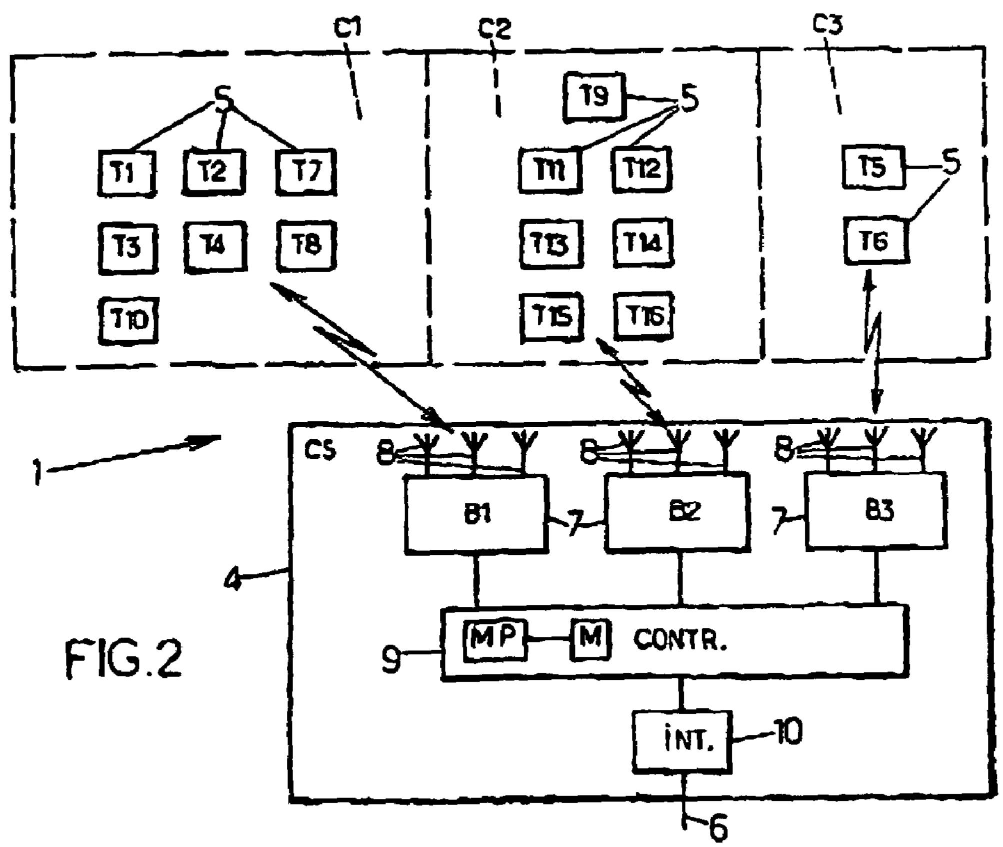
FIG. 2 is a block diagram of the communication system shown in FIG. 1.

As shown in FIG. 2, the central station 4 comprises several bases 7 (B1–B3) connected to a central controller 9 (CONTR.) which controls said bases 7 as will be explained below and which, in the example shown, further acts as a concentrator and is connected to the aforementioned link 6 via an interface 10 (INT.) comprising, for example, a modem or the like.

The controller 9 is an electronic circuit comprising in particular a microprocessor MP connected to a memory M.

The bases 7, for their part, are fixed bases adapted to communicate with the terminals 5 according to the chosen radiocommunication protocol, for example the BLUETOOTH protocol. Such bases 7 are well known in the state of the art, as are the radio circuits of the terminals 5.

The bases 7 are disposed in the immediate vicinity of one another, and the central station 4 preferably forms a single unit.

In the example shown, the bases 7 are each advantageously (but not necessarily) equipped with a network of antennas 8 with controlled directivity, the electronic circuits of each base 7 then being adapted, in a manner known per se, to shift the phase of the different antennas 8 of each base 7 in relation to one another so as to create spatial directivity for reception and transmission.

Given this directivity of the networks of antennas 8, and also given the configuration of the location 2, each of the bases 7 communicates with only some of the terminals 5 which are assigned to it within a cell, C1, C2, C3 respectively. Thus, in the example shown in FIGS. 1 and 2, the base B1 communicates with terminals T1, T2, T3, T4, T7, T8 and T10, the base B2 communicates with terminals T9, T11, T12, T13, T14, T15 and T16, and the base B3 communicates with terminals T5, T6.

The bases preferably transmit to the controller 9, at regular time intervals, the identities of all the terminals 5 belonging to the local radiocommunication system, i.e. of all the terminals with which they respectively communicate (possibly only updates of this list may be communicated to the controller 9 by the bases, for example when a base loses the link with a terminal or when a base sets up a link to a new terminal).

In fact, when some of the terminals 5 are moved, for example terminals T9 and T11 in the example shown in FIGS. 1 and 2, these terminals may, where appropriate, cease to communicate with the base 7 to which they were previously assigned and may possibly communicate with a new base 7.

These changes of bases may be controlled, for example, by the controller 9, in particular according to the quality of the communication between each terminal 5 and each base 7.

Each base 7 communicates with the terminals 5 which are assigned to it according to a master/slave process where the base 7 plays the role of master once the radio link has been set up with the corresponding terminal 5.

In this master/slave process, the base 7 controls the communication with each terminal 5 which is assigned to it, by controlling the use of successive time slots Si, Si+1, Si+2, etc. (see FIG. 3), which are of a constant duration θ with a value of 625 μs and which are each intended to enable the transmission of an information packet PI (or two information packets in the specific case of packets transmitted in "PAGE" mode, transmitting only an identity code from a base to the terminals, or a portion of an information packet PI when a packet extending over several successive slots is involved).

In the example under consideration, where the radiocommunication protocol used is the BLUETOOTH protocol, each information packet PI comprises an access code with a length of 72 bits, a header H with a length of 54 bits, and a payload part P, transporting, for example, voice and/or other information in digital form, with a length of between 0 and 2745 bits. Moreover, the exchanges between bases and terminals take place for each base in a frequency channel chosen from 80 available channels, determined by each base according to a andom process (the frequency used is therefore known to each base after this random determination).

In the most common case, each information packet PI is a standard information packet contained in a single time slot Si, with a duration slightly below the aforementioned duration θ, and the successive time slots are assigned alternately:

to the transmissions by the base of downlink information packets to the terminals 5 corresponding to this base, and to the receptions by the base of uplink information packets transmitted by the terminals assigned to this base.

Thus, in the example under consideration, the even time slots of each base 5 are assigned to the downlinks, i.e. to the transmissions of downlink information packets by this base, whereas the odd time slots are assigned to the uplinks, i.e. to the receptions by the base of uplink information packets originating from the terminals.

Figure 3:
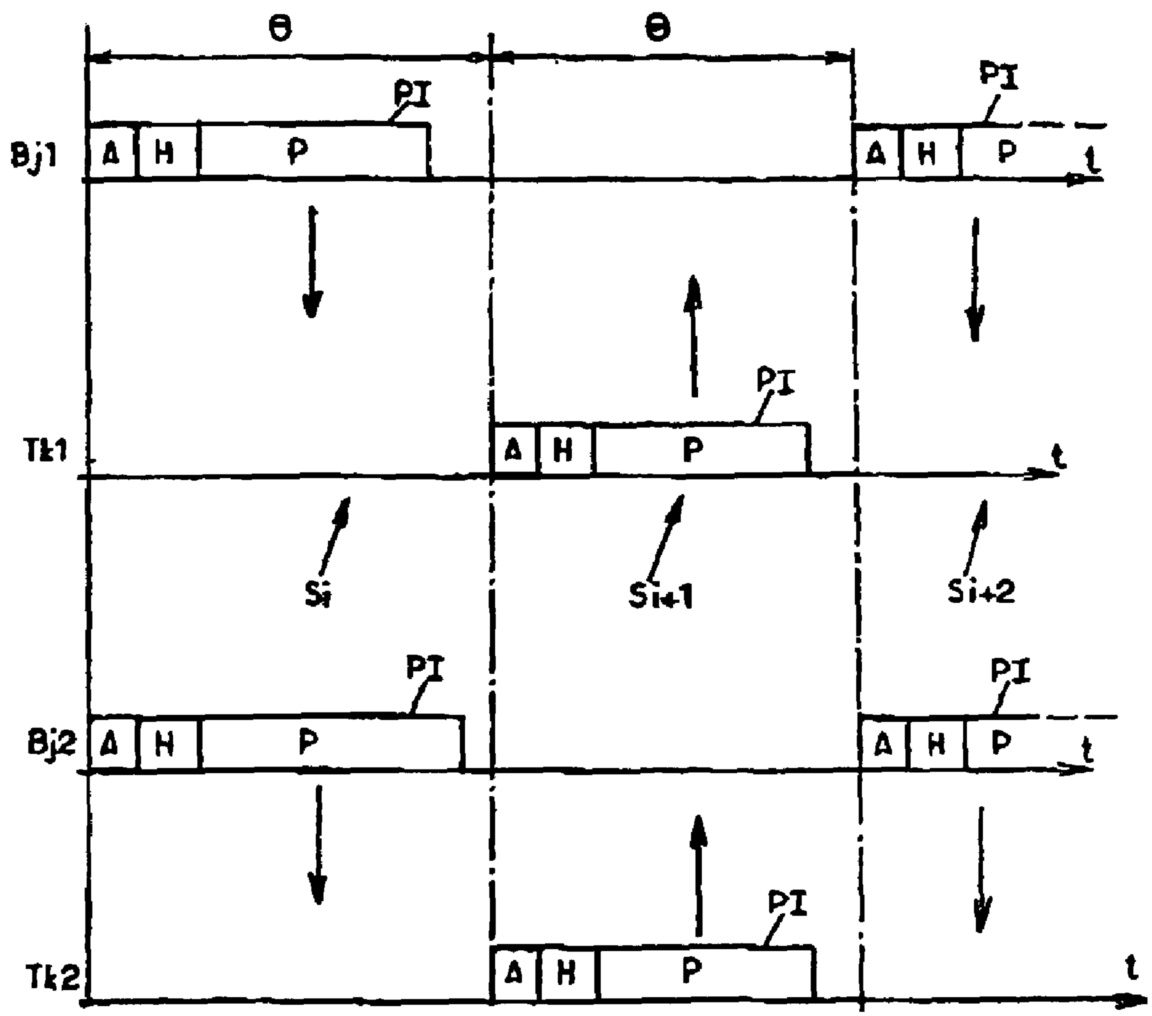
FIG. 3 shows a graphical illustration of the signals exchanged between two bases and two terminals during a short space of time.

As shown in FIG. 3 in the simplified case of two bases Bj1, Bj2, each respectively communicating with a single terminal, Tk1, Tk2 respectively, the controller 9 preferably imposes on the different bases 7 a synchronization of their time slots Si, Si+1, Si+2 (possibly with slight accidental or deliberate differences between the starts of the time slots of the different bases, less than the guard time, i.e. than the difference between the duration θ and the duration of a standard information packet), also so that the rows of time slots of the different bases coincide with one another.

This measure already makes it possible for some of the interferences between channels to be avoided, i.e. interferences between the transmission of a downlink information packet by one of the bases 7, for example the base of the Bj1s, during the reception of an uplink information packet by a different base, for example the base Bj2, in which case the reception of the uplink information packet is rendered impossible given the much higher amplitude of the radio signal corresponding to the downlink information packet in relation to the amplitude of the radio signal corresponding to the uplink information packet.

However, this measure is not adequate to prevent a sufficient fraction of the interferences between channels, since the bases 7 and/or the terminals 5 may transmit large information packets extending over several successive time slots, in this case three time slots, or five time slots in the case of the BLUETOOTH radiocommunication protocol.

In this case, there is in fact a risk that one of the terminals 5 will transmit an uplink information packet during the odd time slot or slots during which the transmission of a long downlink information packet by one of the bases 7 is taking place, in which case the, uplink information packet concerned may not be received by the corresponding base.

Similarly, when a long uplink information packet is transmitted by one of the terminals 5 to the corresponding base 7, there is a risk that a different base 7 will transmit a downlink information packet in the even time slot or in one of the even time slots during the transmission of said long uplink information packet: in this case, there is a risk that said uplink information data packet will be poorly received by the corresponding base.

In the two cases envisaged here, a new transmission of the unreceived uplink information packet is necessary, which reduces the throughput of the information system.

In order to overcome this disadvantage, the invention provides that each base 7 transmits the chronology of its planned transmissions and receptions in real time to the controller 9, this being possible due to the fact that the bases 7 themselves control the communication with the terminals 5 which are assigned to them (in particular the uplink information packets are sent by the terminals in response to messages received from the bases).

The controller 9 then determines in real time whether there is a risk of interference between the transmissions and the transmissions planned by the different bases 7. If such a risk of interference exists, the controller 9 imposes on the different bases 7 a chronology of the planned transmissions (transmissions and/or receptions) enabling at least some of said interferences, and preferably the totality of these interferences, to be avoided.

For example, the controller 9 forces one or more bases 7 to delay some planned transmissions and/or receptions of information packets.

In particular, the controller may be adapted in such a way that:

when a base 7 has to send a long information packet (extending over 3 or 5 time slots in the case of the BLUETOOTH protocol) to a terminal 5, it prevents the other bases from sending to the other terminals 5 a downlink information packet requesting a response during the transmission of said long information packet, and, when a terminal 5 has to send a long information packet to a base 7, it prevents the other bases from sending a downlink information packet during the transmission of this long information packet.

If necessary, the controller 9 may give priority to certain categories of information transmissions. In particular, the bases 7 may transmit to the controller 9 in real time, not only the chronology of their planned transmissions and receptions, but also the category of the information to be transmitted, in such a way as to indicate to the controller 9 particularly if the planned transmissions are intended to transport voice signals. In this case, the controller 9 may be adapted to give priority to the transmissions of voice signals, generally corresponding to telephone conversations, in such a way as to avoid the effects of chopping of the transmitted voice signals.

Furthermore, the controller 9 may possibly, at regular time intervals (for example at intervals of between 5 s and 1 h, or preferably between 5 and 30 minutes), follow a process of adjustment of the networks of antennas 8 of the bases 7, instigating the transmission of a test radio signal to each of the bases 7 in turn (in particular a signal in "PAGE" mode).

Depending on the modifications made in the electromagnetic environment of the radiocommunication system 1 since the latest adjustment (moving of furniture, particularly metallic furniture, opening or closing of doors or windows, etc.), each base 7 may then modify the directivity of its antennas 8 during these transmissions in order to minimize the signals received by the other bases 7, while ensuring that all of the bases 7 enable communication under good conditions with all of the terminals 5 of the location 2 concerned.

During this adjustment process, when a base transmits a test radio signal, the level of the radio signal measured by the other bases is transmitted to the controller 9.

Moreover, each terminal which receives a test radio signal (in this case an information packet in "PAGE" mode, according to the BLUETOOTH protocol) transmits a response to the base which transmitted this signal, in such a way that this base knows the identity of all the terminals which are adapted to communicate with it in each of the antenna configurations under test. Moreover, each base measures the level of the response signal which it receives from each terminal which has responded to it, or, alternatively, the terminal measures the level of the signal which it receives from each base and transmits this level to the base in its response. These terminal identities and the signal levels thus measured are transmitted to the controller.

From the information thus collected during the adjustment process, the controller may determine respective antenna configurations of the different bases, thereby enabling minimization of the levels of radio signals received by the bases during the transmission of said test radio signals, while ensuring that each terminal can communicate under good conditions with at least one base with these adopted antenna configurations.

Finally, the controller 9 imposes the adopted antenna configurations on the bases 2 and indicates to them the identities of the terminals which are assigned respectively to them.

Moreover, once all the adjustments of the antenna networks are completed, depending on the levels of the radio signals received by the bases during the adjustment process and corresponding to the adjustments made, the controller 9 determines and stores pairs of bases 7 susceptible to reciprocal interference, i.e. pairs of bases 7 such that the transmission by one of these two bases of a downlink information radio signal to a terminal 5 is susceptible to interfere with an uplink information radio signal transmitted by a different terminal 5 to the other of these two bases, thereby preventing the good reception of the uplink information radio signal.

In this case, the controller 9 may advantageously be adapted to delay at least some of the planned transmissions only between said bases susceptible to reciprocal interference, in order to avoid the interferences. Conversely, the controller 9 does not interfere with the planned transmissions between bases which are not susceptible to reciprocal interference, thereby simplifying the work of said controller and improving its speed.

The aforementioned measurements of the levels of radio signals received by the bases 7 during the adjustment phase could possibly be carried out at the different frequencies permitted by the local radiocommunication protocol which is used, and the controller 9 may then determine and store pairs of frequencies susceptible to reciprocal interference for each pair of bases 7 susceptible to reciprocal interference.

In other words, the controller 9 stores, for each pair of bases 7 susceptible to reciprocal interference, pairs of first and second frequencies in such a way that the transmission by one of these bases of a radio signal at the first frequency prevents the good reception by the other base of a radio signal transmitted by a terminal 5 at the second frequency.

In the case envisaged above, the bases may be adapted to transmit to the controller in real time, in addition to the aforementioned chronological information of the planned transmissions, planned frequency information indicating the frequency at which the planned transmissions and receptions must take place, and said controller is adapted to delay at least some of the planned transmissions only for said planned frequencies corresponding to a pair of frequencies susceptible to interfere between said bases susceptible to reciprocal interference, so as to avoid the interferences.

It will be noted that, instead of comprising networks of antennas 8 whose directivity is controlled by electronic means only, the bases 7 could comprise one or more directive antennas 8 which can be moved by electromechanical means.

Moreover, it will also be noted that some of the terminals 5 could be beacons fixed at certain specific positions of the location 2, adapted to guarantee that the totality of said location falls well within the radio coverage of the local radiocommunication network 1.

The invention claimed is:

1. A local radiocommunication system, comprising:

at least one central controller;

several bases connected to the controller and controlled by said controller; and several terminals, each communicating with at least one of the bases according to a master/slave process where each base plays a role of master and each terminal plays a role of slave at least after setting up a radio link between said base and said terminal, the base communicating with the terminals according to the same time division multiple access local radiocommunication protocol, said protocol providing, for each base, successive time slots during which either an uplink information packet sent by a terminal to said base or a downlink information packet sent by said base to said terminal are transmitted, and said base being adapted to determine in advance and impose planned transmissions between said base and said terminal, said planned transmissions comprising planned transmissions of downlink information and planned slots of uplink information, where the terminal is authorized to transmit an uplink information packet to the base, and at least some of said bases are susceptible to reciprocal interference, preventing the reception by one of said bases of an uplink information packet when another of said bases is transmitting a downlink information packet, the different bases being adapted to transmit to the controller, in real time, at least chronological information relating to transmissions planned by said bases, the controller being adapted to determine whether there is a risk of interferences occurring between said planned transmissions, and to impose on the base a chronology of said planned transmissions which enables at least some of said interferences to be avoided.

2. The local radiocommunication system of claim 1, wherein the controller is adapted to synchronize the different bases among themselves in such a way that all said bases transmit more or less during the same time slots and receive more or less during the same time slots.

3. The local radiocommunication system of claim 2, wherein the radiocommunication protocol provides transmission of standard-length information packets extending at most over one time slot, and transmissions of information packets of a longer duration extending over an odd number of more than one successive time slots, the controller being adapted to impose on the different bases that all the standard length uplink information packets corresponding to all said bases are transmitted during the same time slots alternately with other time slots in which all the standard-length, downlink information packets corresponding to all said bases are transmitted.

4. The local radiocommunication system of claim 3, wherein the radiocommunication protocol provides that the terminals send uplink information packets to the bases solely in response to a downlink information packet received from a base, and the controller is adapted to, when a base has to send a long information packet to a terminal, prevent the other bases from sending to the other terminals a downlink information packet requesting a response for the duration of the transmission of said long information packet, and, when a terminal has to send a long information packet to a base, prevent the other bases from sending a downlink information packet for the duration of the transmission of the long information packet.

5. The local radiocommunication system of claim 1, wherein the controller has in its memory information indicating pairs of bases susceptible to reciprocal interference, and is adapted to relay at least some of the planned transmissions only between said bases susceptible to reciprocal interference, so as to avoid at least some interferences.

6. The local radiocommunication system of claim 5, wherein the bases are adapted to each carry out measurements of the signals respectively received when the other bases are transmitting a radio signal, the controller being adapted to determine said pairs of bases susceptible to reciprocal interference on the bases of said measurements.

7. The local radiocommunication system of claim 6, wherein the bases are adapted to transmit to the controller, in addition to the chronological information, planned frequency information indicating the frequency at which the planned transmissions must take place, and wherein the controller has in its memory, for each pair of bases susceptible to reciprocal interference, information indicating pairs of interference frequencies at which said bases are susceptible to reciprocal interference, and wherein said controller is adapted to delay at least some of the planned transmissions only for said planned frequencies corresponding to a pair of interference frequencies between said bases susceptible to reciprocal interference, so as to avoid at least some interferences.

8. The local radiocommunication system of claim 1, wherein the bases are adapted to transmit to the controller, in addition to the chronological information, planned transmission category information indicating at least whether the information to be transmitted is or is not voice, and wherein the controller is adapted not to delay planned voice transmission.

9. The local radiocommunication system of claim 1, wherein the different bases are disposed in the immediate vicinity of one another.

10. The local radiocommunication system of claim 1, wherein the controller and the bases are contained in the same unit.

11. The local radiocommunication system of claim 1, wherein the controller also acts as a concentrator and makes the bases communicate with an external link.

12. The local radiocommunication system of claim 1, wherein the bases and the terminals are adapted to communicate according to the BLUETOOTH protocol.

13. A local radiocommunication system having several bases and several terminals, each terminal communicating with one of the bases according to a time division multiple access local radiocommunication protocol, said protocol providing, for each base, successive time slots during which either an uplink information packet sent by a terminal to said base, or a downlink information packet sent by said base to said terminal are transmitted, wherein at least some of said bases are susceptible to reciprocal interference and prevent the reception by one of said bases of an uplink information packet if another of said bases transmits a downstream information packet and, wherein the bases each comprise a network of antennas with controlled directivity and which are adapted to enable said network of antennas to adapt several configurations of antennas with different directivities, the local radiocommunications system comprising:

means to instigate successively the transmission of test radio signals by each base in different antenna configurations;

means to then measure the levels of radio signals received by the other bases;

means to measure the quality of the communication between the base which transmitted the test radio signal and the terminals; and a central controller communicating with all the bases and controlling said bases, the central controller being adapted to determine, among the antenna configuration of each base used during the transmission of test radio signals, an antenna configuration adapted to minimize the level of radio signals received by the other bases during transmissions of said radio signals, while ensuring satisfactory quality of communication between the bases and all the terminals, said central controller being adapted to impose said configurations on the bases.

14. The local radiocommunication system of claim 13, wherein each base is adapted to transmit said test radio signals, to measure the levels of radio signals received following the test radio signals transmitted by the other bases, and to transmit said radio signal levels to the controller, wherein each terminal is adapted to transmit a response when it receives a test radio signal transmitted by a base, wherein each base is adapted to determine the identities of terminals which have responded to its test radio signals, to measure the levels of the signals received from the terminals in response to said test radio signals, and to transmit to the controller the identities and also said radio signal levels thus received from the terminals, said identities corresponding to the terminals which are able to communicate with the base concerned in the antenna configuration of the base which served to transmit the test signal, and wherein the controller is adapted to determine the respective antenna configurations of the different bases, enabling the radio signal levels received by the bases during the transmission of said test radio signals to be memorized, while ensuring that each terminal communicates in a satisfactory manner with at least one base with the antenna configurations.

15. The local radiocommunication system of claim 14, in which the bases are adapted to transmit to the controller, at regular time intervals, the identities of all the terminals belonging to the local radio communication system.

16. The local radiocommunication system of claim 13, wherein the controller is adapted to synchronize the different bases among themselves in such a way that all the bases transmit more or less during the same time slots and receive during more or less during the same time slots.

17. The local radiocommunication system of claim 13, wherein the different bases are disposed in the immediate vicinity of one another.

18. The local radiocommunication system of claim 13, wherein the controller and the bases are contained in the same unit.

19. The local radioconimunication system of claim 13, wherein the controller also acts as a concentrator and makes bases communicate with an external link.

20. The local radiocommunication system of claim 13, wherein the bases and the terminals are adapted to communicate according to the BLUETOOTH protocol.

21. The local radiocommunication system of claim 13, wherein the bases are adapted to transmit said test radio signals at time intervals between five seconds and one hour.

22. The local radiocommunication system of claim 13, wherein some of the terminals are beacons fixed in certain positions at a location served by the local radiocommunication network, said positions being adapted to guarantee that the totality of said location falls well within the radio coverage of the local radio communication network.

* * * * *